(12) United States Patent
Stahlberg et al.

(10) Patent No.: US 9,087,194 B2
(45) Date of Patent: Jul. 21, 2015

(54) PROVIDING INFORMATION TO A SECURITY APPLICATION

(75) Inventors: Mika Stahlberg, Espoo (FI); Antti Tikkanen, Espoo (FI); Jorn Sierwald, Kiel (DE); Timo Harmonen, Nummela (FI); Mika Eloranta, Helsinki (FI)

(73) Assignee: F-Secure Corporation, Helsinki (FI)

( * ) Notice: Subject to any disclaimer, the term of this patent is extended or adjusted under 35 U.S.C. 154(b) by 168 days.

(21) Appl. No.: 13/259,544

(22) PCT Filed: Apr. 8, 2010

(86) PCT No.: PCT/EP2010/054648
§ 371 (c)(1),
(2), (4) Date: Nov. 7, 2011

(87) PCT Pub. No.: WO2010/115959
PCT Pub. Date: Oct. 14, 2010

(65) Prior Publication Data
US 2012/0054870 A1    Mar. 1, 2012

(30) Foreign Application Priority Data
Apr. 9, 2009  (GB) .................................. 0906181.3

(51) Int. Cl.
*G06F 21/56*  (2013.01)
(52) U.S. Cl.
CPC ...................................... *G06F 21/56* (2013.01)
(58) Field of Classification Search
CPC ...................................................... G06F 21/56
See application file for complete search history.

(56) References Cited

U.S. PATENT DOCUMENTS

| 5,960,170 | A  | * | 9/1999  | Chen et al. ................ 714/38.14 |
| 7,065,790 | B1 | * | 6/2006  | Gryaznov ...................... 726/24 |
| 7,152,164 | B1 |   | 12/2006 | Loukas ........................ 713/188 |
| 7,472,420 | B1 | * | 12/2008 | Pavlyushchik ................ 726/24 |
| 7,523,500 | B1 | * | 4/2009  | Szor et al. ..................... 726/24 |
| 7,594,272 | B1 | * | 9/2009  | Kennedy et al. ............... 726/24 |
| 8,832,835 | B1 | * | 9/2014  | Chen et al. .................... 726/24 |
| 2002/0174358 | A1 | * | 11/2002 | Wolff et al. .................. 713/200 |
| 2004/0083381 | A1 | * | 4/2004  | Sobel et al. .................. 713/200 |
| 2005/0283837 | A1 | * | 12/2005 | Olivier et al. ................. 726/24 |

(Continued)

FOREIGN PATENT DOCUMENTS

| EP | 1 041 497 A2  | 10/2000 |
| WO | WO-98/41919 A1 | 9/1998  |

OTHER PUBLICATIONS bakura_revenge, "What wrong with this computer . . . ", Jul. 6, 2007, http://forums.malwarebytes.org/index.php?showtopic=1969.*

(Continued)

*Primary Examiner* — Darren B Schwartz
(74) *Attorney, Agent, or Firm* — Harrington & Smith

(57) ABSTRACT

A method and apparatus for providing information to a security application at a client device. A server receives a request from the client device for information of an object at the client device. The request includes the signature information required by the server to identify the object. The server queries a database to determine the required information of the object and to determine information of at least one further object, and a response is sent to the client device. The response includes the information relating to the object, an identity of the at least one further object, and the information relating to the at least one further object.

7 Claims, 2 Drawing Sheets

(56) References Cited

U.S. PATENT DOCUMENTS

| | | | |
|---|---|---|---|
| 2008/0086773 A1* | 4/2008 | Tuvell et al. | 726/23 |
| 2008/0147612 A1 | 6/2008 | Gryaznov | 707/3 |
| 2008/0222268 A1* | 9/2008 | Miyamoto et al. | 709/217 |
| 2009/0320134 A1* | 12/2009 | Corcoran et al. | 726/24 |
| 2010/0077481 A1* | 3/2010 | Polyakov et al. | 726/24 |
| 2010/0242094 A1* | 9/2010 | Hussain et al. | 726/4 |
| 2010/0257609 A1* | 10/2010 | Niemela | 726/24 |
| 2010/0262584 A1* | 10/2010 | Turbin et al. | 707/674 |

OTHER PUBLICATIONS

Apple Inc.: "Apple Software Update—screen shots of application", XP002591231, 2007, 3 pgs.

\* cited by examiner

PROVIDING INFORMATION TO A SECURITY APPLICATION

FIELD OF THE INVENTION

The present invention relates to the field of providing signature information to a security application at a client device.

BACKGROUND TO THE INVENTION

Malware is short for malicious software and is used as a term to refer to any software designed to infiltrate or damage a computer system without the owner's informed consent. Malware can include viruses, worms, trojan horses, rootkits, adware, spyware and any other malicious and unwanted software. Any client device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Detecting malware is challenging as the malware authors design their software to be difficult to detect, often employing technology that deliberately hides the presence of malware on a system, i.e. the malware application may not show up on the operating system tables that list currently running processes.

Client devices make use of anti-virus applications to detect and possibly remove malware. This anti-virus application can make use of various methods to detect malware including scanning, integrity checking and heuristic analysis. Of these methods, malware scanning involves the anti-virus application examining files for a virus fingerprint or "signature" that is characteristic of an individual malware program. Typically, this requires that the anti-virus application has a database containing the signatures. When the provider of the anti-virus application identifies a new malware threat, the threat is analysed and its signature is extracted. The malware is then "known" and its signature can be supplied as updates to the anti-virus application database. However, scanning files for malware can consume significant processing resources potentially resulting in a reduction in the performance of a computing device. As the number more malware applications are identified, the size of the database grows. This leads to slower scanning times, increased memory consumption and makes boot up times for client devices longer.

Various anti-virus applications are available on the market today. These tend to work by maintaining a database of signatures or fingerprints for known viruses. With a "real time" scanning application, when a user tries to perform an operation on a file, e.g. open, save, or copy, the request is redirected to the anti-virus application. If the application has no existing record of the file, the file is scanned for known virus signatures. If a virus is identified in a file, the anti-virus application reports this to the user, for example by displaying a message in a pop-up window. The anti-virus application may then add the identity of the infected file to a register of infected files. Access to the file is denied. When a subsequent operation on the file is requested, the anti-virus application first checks the register to see if the file is infected. If it is infected, the access is denied. If the file is not infected, access is permitted (the anti-virus application may re-check the file if it detects that the file has changed since the previous check was performed).

One way to avoid the problems of storing a large malware database at the client device is to implement remote anti-virus scanning. An anti-virus application is run at the client device, and if suspected files are identified a request is made to a remote server. The request may include any number of different signatures calculated from the file and other metadata such as the location of the file. The remote server has access to a set of signatures and their categorization, and can respond to the application with a relevant category for the file (for example, "clean" or "infected").

A problem with remote anti-virus scanning is that the number of requests made to the server will typically be very large. Each request has an in-built latency because communications are exchanged between the server and the client device, which increases scanning times. Furthermore, the server must have a great deal of redundancy built into its bandwidth and processing capabilities in order to handle large numbers of requests at peak times.

Similar problems are encountered by other security applications, such as "safe surf" applications that allow web browsers to access certain websites.

SUMMARY OF THE INVENTION

It is an object of the invention to provide improved methods for remote scanning of objects such as electronic files stored at a client device, that reduce the amount of signalling required between the client device and a server.

According to a first aspect of the invention, there is provided a method of providing information to a security application at a client device. A server receives a request from the client device for information of an object at the client device. The request includes signature information required by the server to identify the object. The server queries a database to determine the required signature information of the object and to determine signature information of at least one further object, and a response is sent to the client device. The response includes the signature information relating to the object, an identity of the at least one further object, and the signature information relating to the at least one further object.

As an option, the response further comprises context information associated with the object and context information associated with the at least one further object. Context information is optionally selected from any of an object status and information instructing the security application how to handle the object. For example, where the object is an electronic file and the security application is an anti-virus application, the context information may inform the anti-virus application that the electronic file is "known clean", "known malware", or "not known", and the anti-virus application can determine how to handle the object on the basis of that information.

As an option, the signature information comprises any of a digital signature, a portion of the object, a location of the object, a date associated with the object, a type of object, a size of object, an author of the object, a version number of the object and registry entries associated with the object.

There are several ways in which links between objects can be made in order to determine the further object for which information is likely to be required. One way is to statically provision links between the further object and the object. For example, where the objects are electronic files relating to a software package, associated files in that software package may be statically provisioned. Alternatively or additionally, links may be provisioned dynamically by analysing further requests for signature information of an additional object received from the client device and/or other client devices, and storing links between the object and the additional object on the basis of the number of further requests received.

The object is optionally selected from any of an electronic file, a Uniform Resource Locator, Registry data, and user data.

According to a second aspect of the invention, there is provided a method of operating a security application for assessing objects stored at a client device. A determination is made that information is required for a first object. A request is sent to a remote server for the information, the request including signature information to assist the server in identifying the object. The client device receives a response from the remote server, the response including the requested information, an identity of a second object, and information for the second object. The information relating to the second object is stored. If it is later determined that information is required for a further object, a determination is made whether the further object is the same as the second object and, if so, the stored information of the second object is retrieved and used by the security application. If not, then the client device sends a request to the remote server for information of the further object.

Objects are optionally selected from any of electronic files, Uniform Resource Locators, Registry data, and user data According to a third aspect of the invention, there is provided a server for use in a communication network. The server is provided with a receiver for receiving a request from a remote client device for information of an object stored at the client device. Means for querying a database are provided to determine the information of the object and to determine information of at least one further object. A transmitter is also provided for sending a response to the client device, the response including the information of the object, an identity of the further object, and the information of the further object.

Links between the object and the further object are optionally provisioned in the server statically on the basis of one of files provided by a common software vendor and files provided in a single installation package, or dynamically on the basis of analysis of requests for signature information from the client device and/or other client devices.

According to a fourth aspect of the invention, there is provided a client device. The client device is provided with storage means for storing a plurality of objects, a processor arranged to run a security application and determine that information is required for a first object stored in the memory, and a transmitter for sending a request to a remote server for the information, the request including signature information of the object to assist the server in identifying the object. A receiver is also provided for receiving from the remote server a response, the response including the requested information, information identifying a second object and information of the second object. A cache is provided for storing the information of the second object. The processor is further arranged to determine that information is required for a further object, and to then determine whether the further object is the same as the second object and, if so, retrieve the stored information of the second object from the cache for use by the security application.

According to a fifth aspect of the invention, there is provided a computer program, comprising computer readable code which, when run on a server, causes the server to behave as a server as described in the third aspect of the invention.

According to a sixth aspect of the invention, there is provided a computer program, comprising computer readable code which, when run on a client device, causes the client device to behave as a client device as described in the fourth aspect of the invention.

According to a seventh aspect of the invention, there is provided a computer program product comprising a computer readable medium and a computer program as described in either of the fifth and sixth aspects of the invention, wherein the computer program is stored on the computer readable medium.

DETAILED DESCRIPTION OF CERTAIN EMBODIMENTS

Figure 1:
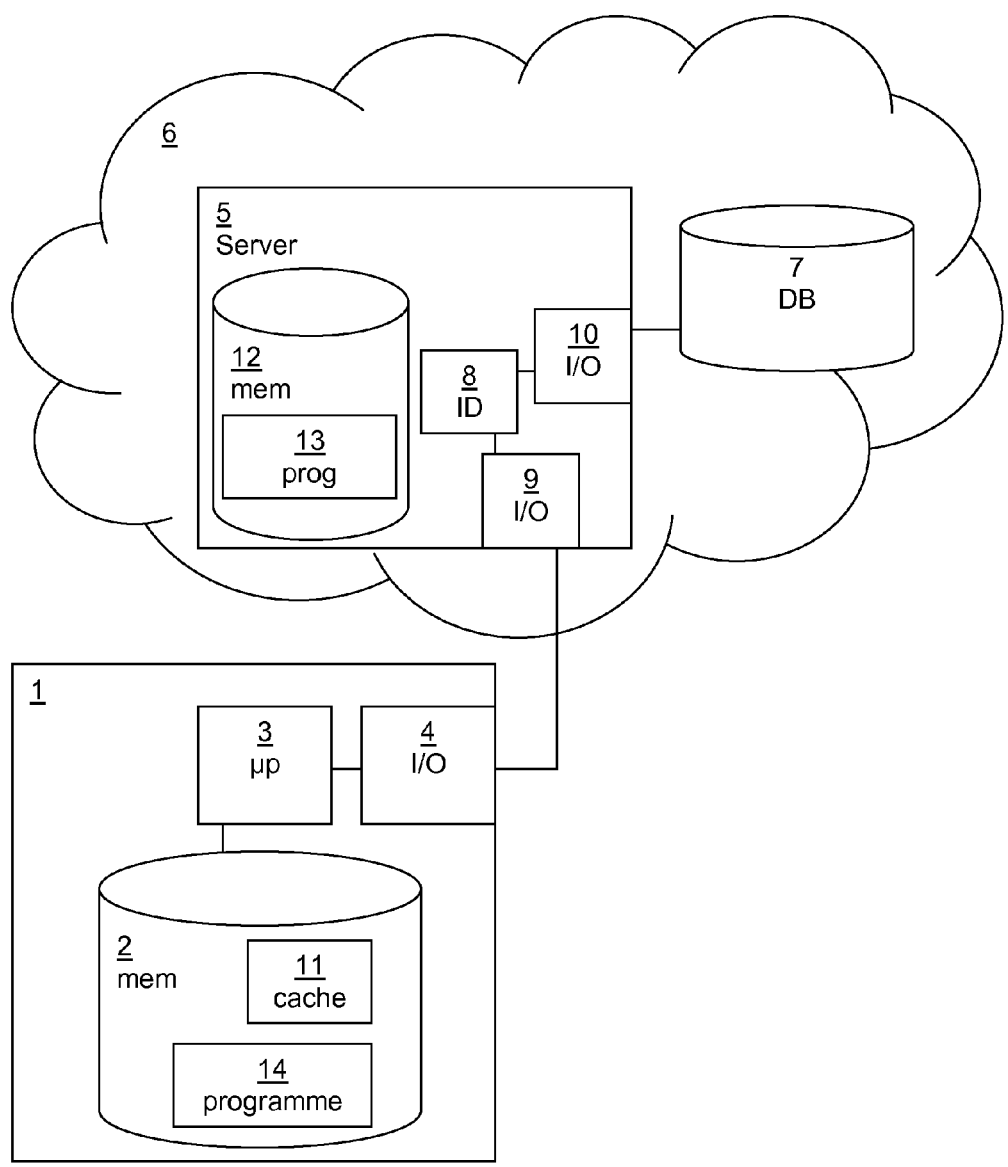
FIG. 1 illustrates schematically in a block diagram a typical network architecture according to an embodiment of the invention.

Referring to FIG. 1, there is illustrated a client device 1. The client device 1 may be any type of client device, such as a desktop personal computer, a laptop computer, a mobile telephone, a Personal Digital Assistant (PDA) and so on. The client device has storage means such as a memory 2 in which files are stored. The memory 2 may be any writable medium in which electronic files can be stored, such as a hard disk, a Random Access Memory, a flash disk and so on. Furthermore, whilst the memory 2 may be integral with the client device 1 it may also simply be connected to the client device 1. An example of a memory 2 connected to a client device is a hard disk connected via a USB connection to a desktop personal computer. A processor 3 is provided for running an anti-virus application and scanning the memory 2. In addition, an I/O device 4 is provided for allowing the client device 1 to communicate with remote nodes.

When an anti-virus application is executed at the client device, the memory 2 is scanned for viruses. If an object such as a file (or group of files) is suspected of being malware, the I/O device 4 sends a request to a server 5 operated by a third party 6 such as the vendor of the anti-virus application. The request includes any relevant signature information relating to the object. Signature information includes any of, and is not limited to, file name, file type, file location, date of creation, date of modification, associated registry settings and so on. Note that the term "objects" is used herein to refer to any type of object that can be stored at the client device 1. Examples of such objects include electronic files, Uniform Resource Locators (URLs), user data, Registry data such as keys and so on.

The server 5 receives the request, and an identification function 8 at the server analyses the information about the file received from the client device 1, and queries the database 7. The identification function 8 uses the received signature information and signature information obtained from the database to categorize the object (for example, as unknown, clean or infected).

In addition the above functions, the identification function 8 also analyses the information and determines further likely requests that it may receive from the client device. For example, if the request relates to a file known to belong to the Spanish version of Microsoft® Windows XP, it is very likely that subsequent requests will relate to other files belonging to the Spanish version of Microsoft Windows XP. Similarly, if a request is received relating to a file that is known to belong to a particular application, then it is likely that the memory 2 of the client device 1 will contain other files belonging to that application.

Once further likely requests have been determined, the identification function obtains signature information relating to the objects subject to further likely requests. A response is sent to the client device 1 from the server 5 that contains the results for the requested object, and in addition signature information relating to the likely further requested objects and the identities of the likely further requested objects.

The client device 1 stores the signature information relating to likely further requests object in a cache 11 (which may be part of the memory 2 or separate from the memory) and, if the scan determines that signature information relating to one of those object is required, it obtains the signature information from the cache 11 rather than sending a new request to the server 5.

There are several ways in which further likely requests can be determined. A first way is to statically connect file signature information in the database. This can be done by associating files from the same software package or software vendor together. For example, if the client device has a copy of Spanish Windows XP, and the scan is currently requesting information about a file from Spanish Windows XP, then it is very likely that the next request will relate to a file belonging to a typical installation of Spanish Windows XP.

An alternative way to determine further likely requests is to dynamically build up a database of links based on requests. For example, if many different client devices all request signature information relating to file A and subsequently request signature information relating to file B, then a link can be made between these two files even if they are otherwise unrelated (for example, they may not belong to the same software application, and may not even be provided by the same software vendor). Any subsequent requests for file A can be replied to with a message including signature information relating to file A and signature information relating to file B.

The cache may be provided with a "time-out" such that information relating to objects is removed from the cache after a pre-determined period of time. This prevents the cache from storing signature information that may not be relevant for long periods.

The Server 5 may be provided with a computer readable medium in the from of a memory 12 in which a computer programme 13 is stored that enables the Server to run as described above. Similarly, the memory 2 of the client device 1 may also be used to store a computer programme 14 that enables the client device to run as described above.

Figure 2:
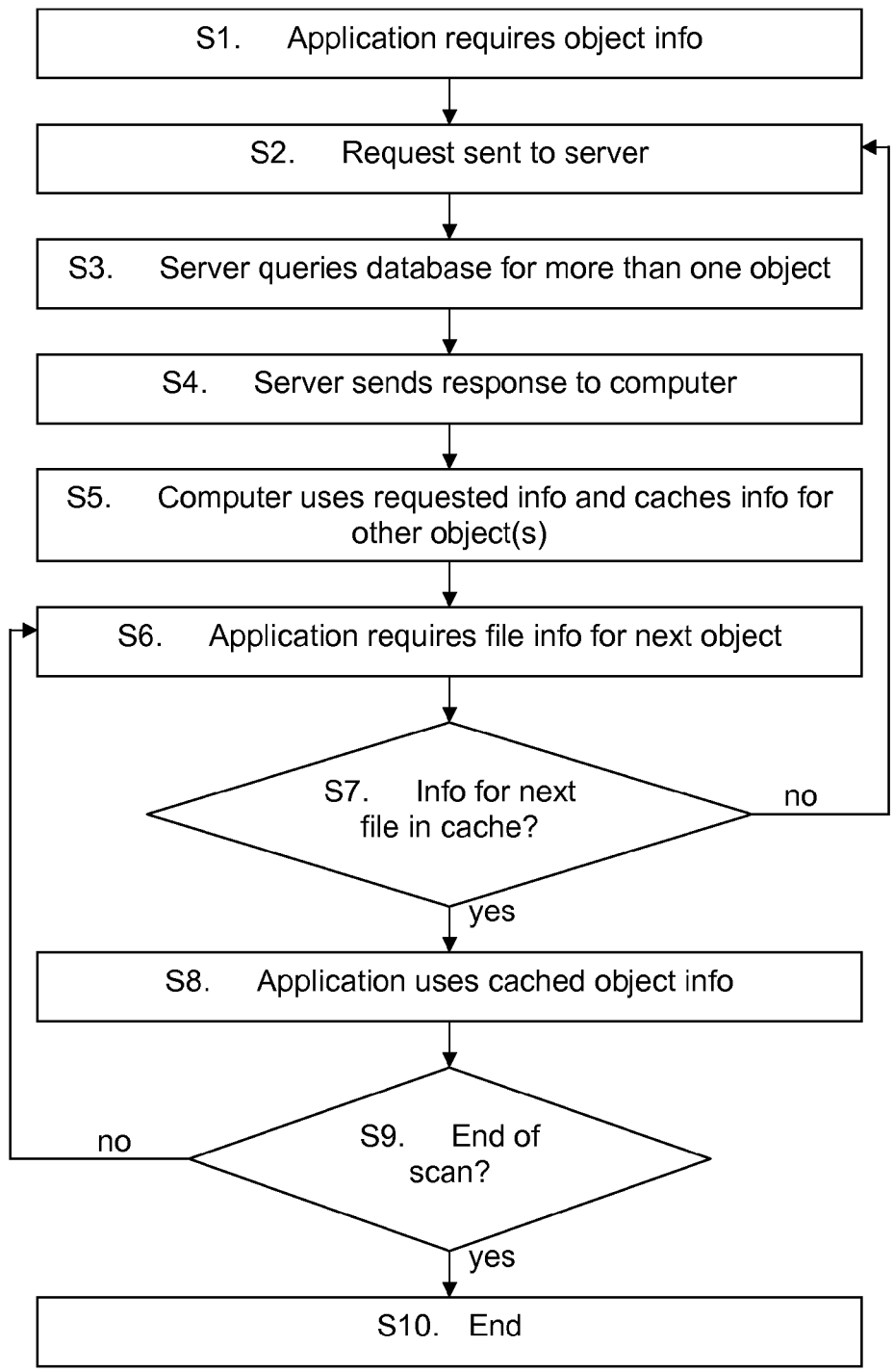
FIG. 2 is a flow diagram illustrating a method according to an embodiment of the invention.

An embodiment of the invention is summarized in FIG. 2, with the following numbering corresponding to the numbering of FIG. 2:

S1. During a scan of the memory, the anti-virus scanner requires context information about an object such as an electronic file, and acquires signature information about the object stored in the memory 2.

S2. A request is sent from the client device 1 to the server 5.

S3. The server 5 queries the database 7 for the signature information, and also for further signature information about other objects which the server 5 predicts may be required by the client device 1. The server may also perform a check on both the object and further objects to provide context information relating to those objects. Context information allows the client device to make a decision as to how to handle the object. In the case of an anti-virus application, context information may include, for example, whether the electronic file is a known, clean electronic file, whether it is known malware, or whether it is unknown.

S4. A response is sent from the server 5 to the client device 1, including the requested signature information, the further signature information and if available, any context information.

S5. The client device 1 uses the requested signature information as part of the object check, and stores the further signature information in a cache. Where context information is not provided, the client device 1 must obtain context information locally, or simply make a decision based on the received signature information as to how to handle the file.

S6. The scan proceeds and a check is required for the next object subject to the scanning procedure.

S7. The client device 1 determines whether the required signature information and, if required, context information for the next object is already stored in the cache. If not, then a request must be sent to the server, and the method reverts to step S2.

S8. If the signature information and context information for the next file is already stored in the cache, then that signature information is used.

S9. If the scan is to proceed, then the method reverts to step S6, otherwise the scanning procedure ends (S10).

The invention reduces the amount of signalling in performing on-line requests for object information, and speeds up the anti-virus scanning process as information required by the anti-virus application may already be stored locally.

The above description uses the example of a security application being an anti-virus application, and the object being an electronic file. Note, however, that the invention can be applied to other security applications. For example, the object may be a URL. In this case, if the security application is a "safe surf" web site, it may provide context information relating to whether the website indicated by the URL is suitable for children. Context information for one or more related URLs would also be provided.

Another example of an object is a telephone number. In this case, the security application may be a blacklist of telephone numbers. The telephone number may be used by a telemarketer, in which case the context information may be selected from "do not allow calls from this number" and "allow calls from this number".

In the case where an object is a URL, the database of links may be based on surfing habits. For example, if a user typically browses web site A having URL A, and 5 minutes later often moves to website B having URL B, the database of links may reflect this. This allows the security application to load website B in the background in anticipation of the user browsing website B.

It will be appreciated by the person of skill in the art that various modifications may be made to the above described embodiment without departing from the scope of the present invention. For example, the examples given above show the client device having only one memory. It will be appreciated that the memory may be a hard drive, an optical drive, a Random Access Memory, or any other type of memory, and that more than one memory may be provided.

The invention claimed is:

1. A method of operating an anti-virus application, the method comprising:
    assessing electronic files stored at a client device
    configuring at least one processor to perform the functions of:
        determining that context information is required for a first electronic file, the context information being used by the anti-virus application on the client device to decide how to handle the electronic file;

sending a request to a server for the context information;

receiving from the server a response, the response including the requested context information, an identity of a second electronic file associated in a database with the first electronic file, and context information for the second electronic file, wherein the association between the first electronic file and the second electronic file is based on analyzing further requests for context information received from other client devices; wherein when the analysis by the server determines that a predetermined number of other client devices have requested context information relating to the first electronic file and context information relating to the second electronic file, then a link between electronic files is created and stored in the database;

storing the context information relating to the second electronic file;

determining that context information is required for a further electronic file;

determining whether the further electronic file is the same as the second electronic file and, if so, retrieving the stored context information of the second electronic file and, if not, sending a request to the server for context information of the further electronic file.

2. The method according to claim 1, wherein electronic files are selected from any of Uniform Resource Locators, Registry data, and user data.

3. A server for use in a communication network, the server comprising:

a receiver for receiving a request from a client device for context information of an electronic file stored at the client device, the context information being used by an anti-virus application on the client device to decide how to handle the electronic file, the request including signature information of the electronic file;

means for querying a database to determine the context information of the electronic file and to determine context information of at least one further electronic file associated at the database with the electronic file, the association between the electronic file and the at least one further electronic file being based on analyzing by the server further requests for context information received from other client devices; wherein when the analysis by the server determines that a predetermined number of other client devices have requested context information relating to the electronic file and context information relating to the at least one further electronic file, then a link between the electronic file and the at least one further electronic file is created and stored in the database;

a transmitter for sending a response to the client device, the response including the context information of the electronic file, an identity of the at least one further electronic file, and the context information of the at least one further electronic file.

4. A client device comprising:

non-transitory storage media for storing a plurality of electronic files;

a processor arranged to run an anti-virus application and determine that context information is required for a first electronic file stored in the non-transitory storage media, the context information being used by the client device to decide how to handle the first electronic file;

a transmitter for sending a request to a server for the context information, the request including signature information of the first electronic file;

a receiver for receiving from the server a response, the response including the requested context information, information identifying a second electronic file in a database of associated files with the first electronic file, and context information of the second electronic file, wherein the association between the first electronic file and the second electronic file is based on analyzing by the server further requests for context information received from other client devices; wherein when the analysis by the server determines that a predetermined number of other client devices have requested context information relating to the first electronic file and context information relating to the second electronic file, then a link between the electronic files is created and stored in the database;

a cache for storing the context information of the second electronic file;

wherein the processor is further arranged to determine that context information is required for a further electronic file, and to determine whether the further electronic file is the same as the second electronic file and, if so, retrieve the stored context information of the second electronic file for use by the anti-virus application.

5. A system for providing context information to an anti-virus application:

a server for:

building a database of associated electronic files, wherein the database is built by:

receiving requests from client devices for context information associated with specific electronic files, the requests including signature information required by the server to identify the specific electronic files;

analyzing the requests to identify electronic files that are associated with one another, and recording the associations as links between electronic files in a database;

providing context information to the anti-virus application, where the context information is provided by:

receiving a request from a client device for context information associated with a specific electronic file for which an anti-virus scan is being performed by the client device;

querying the database to identify electronic files associated with the specific electronic file by using the recorded links;

sending a response to the client device including context information for the specific electronic file and further context information for a further electronic file associated with the specific electronic file;

at the client device:

receiving the response from the server; and causing the anti-virus application to use the context information to scan the specific electronic file and use the further context information to scan the further electronic file.

6. The method according to claim 5, wherein the signature information comprises any of a digital signature, a portion of the electronic file, a location of the electronic file, a date associated with the electronic file, a type of electronic file, a size of electronic file, an author of the electronic file, a version number of the electronic file and registry entries associated with the electronic file.

7. The method according to claim 5, wherein the electronic file is selected from any of a Uniform Resource Locator, Registry data, and user data.

* * * * *